United States Patent
Fukumoto

(10) Patent No.: US 11,397,659 B2
(45) Date of Patent: Jul. 26, 2022

(54) INFORMATION PROCESSING APPARATUS, INFORMATION PROCESSING METHOD, AND STORAGE MEDIUM

(71) Applicant: FUJITSU LIMITED, Kawasaki (JP)

(72) Inventor: Naoto Fukumoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 36 days.

(21) Appl. No.: 17/102,478

(22) Filed: Nov. 24, 2020

(65) Prior Publication Data

US 2021/0173758 A1    Jun. 10, 2021

(30) Foreign Application Priority Data

Dec. 4, 2019 (JP) .............................. JP2019-219839

(51) Int. Cl.
*G06F 11/34* (2006.01)
*G06F 11/30* (2006.01)
*G06F 9/54* (2006.01)
*G06F 9/38* (2018.01)

(52) U.S. Cl.
CPC ........ *G06F 11/3433* (2013.01); *G06F 9/3877* (2013.01); *G06F 9/54* (2013.01); *G06F 11/3006* (2013.01); *G06F 11/3024* (2013.01); *G06F 11/3062* (2013.01)

(58) Field of Classification Search
CPC ............. G06F 11/3433; G06F 11/3006; G06F 11/3024; G06F 11/3062; G06F 9/3877; G06F 9/54

See application file for complete search history.

(56) References Cited

U.S. PATENT DOCUMENTS

2007/0074011 A1* 3/2007 Borkar .................... G06F 1/324
                                                              712/227
2011/0023047 A1    1/2011 Memik et al.

FOREIGN PATENT DOCUMENTS

| JP | 2010-039923 A | 2/2010 |
| JP | 2012-533827 A | 12/2012 |
| JP | 2017-076414 A | 4/2017 |
| WO | 2007/038530 A2 | 4/2007 |
| WO | 2011/011155 A1 | 1/2011 |

* cited by examiner

*Primary Examiner* — Suraj M Joshi
(74) *Attorney, Agent, or Firm* — Fujitsu Patent Center

(57) ABSTRACT

An information processing apparatus, includes a memory; and a first processor coupled to the memory and configured to: identify a maximum operating frequency of each of a plurality of second processors, when executing a plurality of processes to be subjected to parallel processing by the plurality of second processors, measure a load value representing a magnitude of a load of each of the plurality of processes, and determine, based on the identified maximum operating frequency of each of the plurality of second processors and the measured load value of each of the plurality of processes, a specific processor as an assignment destination of each of the plurality of processes from the plurality of second processors.

9 Claims, 13 Drawing Sheets

INFORMATION PROCESSING APPARATUS, INFORMATION PROCESSING METHOD, AND STORAGE MEDIUM

CROSS-REFERENCE TO RELATED APPLICATION

This application is based upon and claims the benefit of priority of the prior Japanese Patent Application No. 2019-219839, filed on Dec. 4, 2019, the entire contents of which are incorporated herein by reference.

FIELD

The embodiments discussed herein are related to an information processing apparatus, an information processing method, and a storage medium.

BACKGROUND

Conventionally, there is a technique for processing an application including a plurality of processes in parallel in a computer system such as a personal computer (PC) cluster. Examples of the application to be executed include a program that calculates the action of force between particles, a program that calculates the force applied when a vehicle collides, and the like.

In the prior art, for example, there is an operating system that assigns tasks to cores based on a dynamic profile and grouping information of cores in a multi-core processor. Further, there is a technique such that processing operation characteristics of each processor core of a plurality of processor cores are measured, a table recording the processing capacity of the processor core is updated with measurement results, and the processing is scheduled using the table. Furthermore, there is also a technique of scheduling application programs to run on cores that have the optimal core component for the core component type used by the application program. For example, Japanese Laid-open Patent Publication No. 2017-76414, Japanese Laid-open Patent Publication No. 2010-39923, Japanese National Publication of International Patent Application No. 2012-533827, and the like are disclosed as related art.

SUMMARY

According to an aspect of the embodiments, an information processing apparatus, includes a memory; and a first processor coupled to the memory and configured to: identify a maximum operating frequency of each of a plurality of second processors, when executing a plurality of processes to be subjected to parallel processing by the plurality of second processors, measure a load value representing a magnitude of a load of each of the plurality of processes, and determine, based on the identified maximum operating frequency of each of the plurality of second processors and the measured load value of each of the plurality of processes, a specific processor as an assignment destination of each of the plurality of processes from the plurality of second processors.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a block diagram illustrating an exemplary hardware configuration of an information processing apparatus 101 or the like;

DESCRIPTION OF EMBODIMENTS

However, in the conventional technique, parallel processing performance of the application including a plurality of processes may deteriorate. For example, the processing amount of every process may not be uniform due to the characteristics of the application. In this case, the slowest progressing process among the plurality of processes becomes a bottleneck (a rate-determining element), and the parallel processing performance of the application deteriorates.

In view of the above, it is desirable to improve the parallel processing performance of a plurality of processes.

Hereinafter, an information processing apparatus, an information processing method, and a storage medium according to embodiments will be described in detail with reference to the drawings.

EMBODIMENTS

Figure 1:
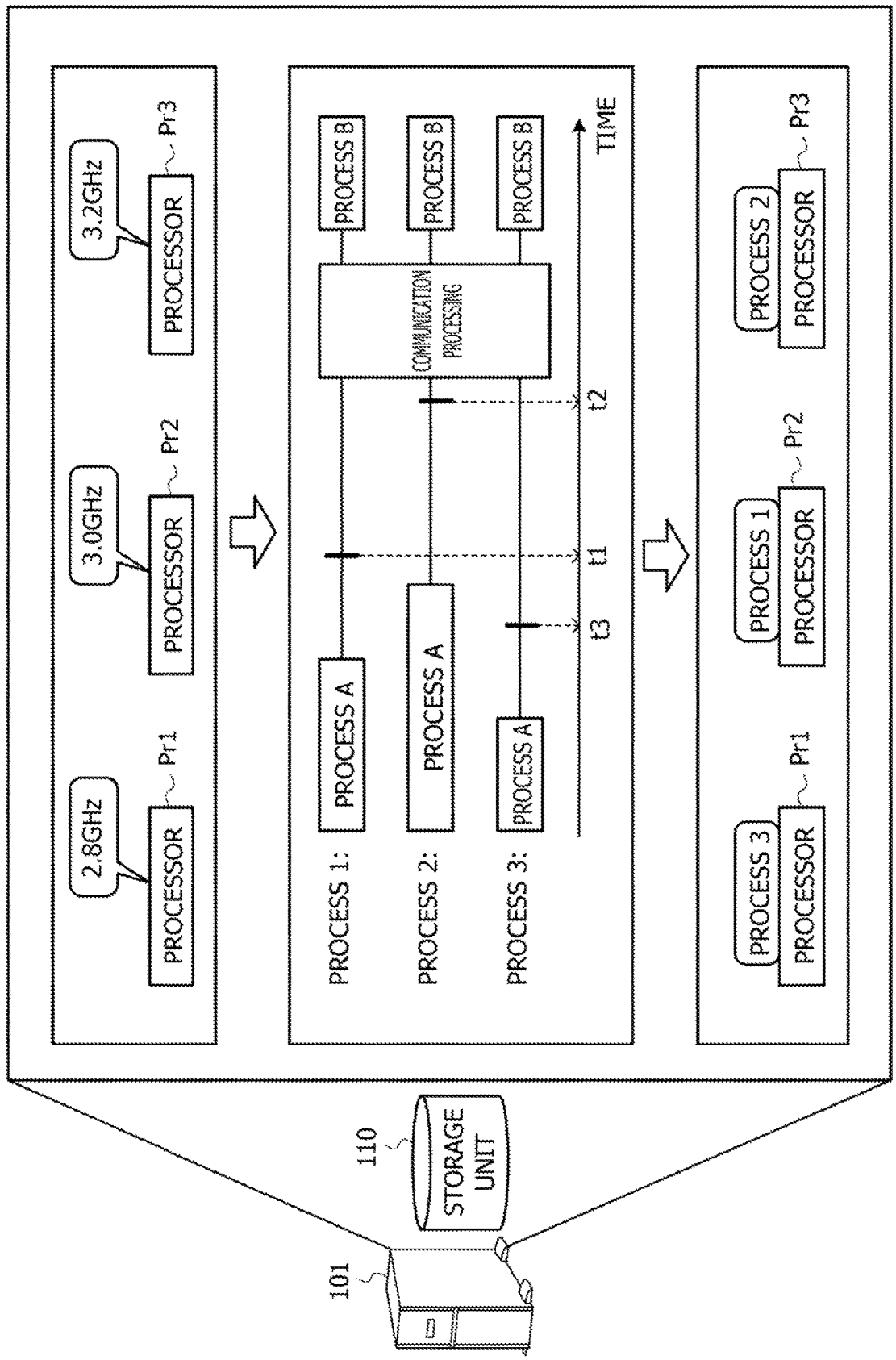
FIG. 1 is an explanatory diagram illustrating an example of an information processing apparatus according to an embodiment.

FIG. 1 is an explanatory diagram illustrating an example of an information processing apparatus according to an embodiment. In FIG. 1, the information processing apparatus 101 is a computer that determines a processor as the assignment destination of each process of a plurality of processes to be subjected to parallel processing by a plurality of processors. Here, the processor is hardware that executes a process, and is, for example, a central processing unit (CPU).

The process is a set of tasks executed by the processor. The plurality of processes is, for example, a set of processes that implements an application. Each of the plurality of processes includes a process of performing communication between the processes. For example, each process performs collective communication in order to aggregate processing results of each process and to synchronize with the processes. Collective communication is communication in which three or more processes participate.

Here, the parallel processing performance of the application including a plurality of processes is determined depending on the process that takes the longest execution time among the plurality of processes. For example, when the processing amount of every process is not uniform, the parallel processing performance of the application is determined by a process having a large processing amount. For example, in an application in which the processing amount of every process is not uniform and a load balance is poor, the parallel processing performance changes depending on the execution time of a process with a large load.

Note that it is also conceivable to divide target processing so that the processing amount of every process becomes uniform. However, some processing contents may be not uniformly dividable. For example, in a program that calculates the effect of force between particles, it is difficult to uniformly divide the processing because the number of particles included in a specific section differs and the particles move over time.

Therefore, in the present embodiment, an information processing method will be described that prevents the slowest progressing process among a plurality of processes from becoming a bottleneck (a rate-determining element) and deteriorating the parallel processing performance of the application. An exemplary process of the information processing apparatus 101 will be described below.

(1) The information processing apparatus 101 measures the maximum operating frequency of each processor of the plurality of processors (for example, processors pr1 to pr3). The maximum operating frequency of a processor is the frequency of the dock that determines processing performance of the processor. Each processor may operate at a higher operating frequency than a rated operating frequency depending on the temperature of each processor. For example, the operating frequency of each processor increases as the temperature of each processor decreases.

Here, for example, each processor may increase the operating frequency by the amounts of margins in temperature and power consumption. On the other hand, it is known that even if the processors are manufactured in the same manufacturing process, the performance varies. When the processor is operated at the rated operating frequency listed in a catalog, there is no performance variation, and thus the performance as a product is guaranteed.

However, when a method mounted on a high-end CPU for improving the operating frequency to the limit, for example, a method of improving the operating frequency while monitoring the temperature and power consumption of the CPU is applied, performance variation occurs. If such a method is not applied, the performance drops by about 15% at the maximum, and thus there may be cases where it is unavoidable to apply this method.

In the example of FIG. 1, the plurality of processors is processors pr1 to pr3. If each of the processors pr1 to pr3 operates at a higher operating frequency than the rated operating frequency, performance variations will occur. Thus, the information processing apparatus 101 measures the maximum operating frequency of each of the processors pr1 to pr3 in order to grasp performance variation of each of the processors pr1 to pr3.

Further, for example, the information processing apparatus 101 can measure the maximum operating frequency of each processor pr using an existing command (for example, turbostat) that acquires the operating frequency. Here, it is assumed that as the maximum operating frequencies of the respective processors pr1 to pr3, the maximum operating frequency of the processor pr1 of "2.8 [GHz]", the maximum operating frequency of the processor pr2 of "3.0 [GHz]", and the maximum operating frequency of the processor pr3 of "3.2 [GHz]" are measured.

However, the maximum operating frequency of each of the plurality of processors (for example, the processors pr1 to pr3) may be measured in advance and stored in the storage unit 110. In this case, the information processing apparatus 101 can identify the maximum operating frequency of each processor by referring to the storage unit 110.

(2) The information processing apparatus 101 measures the load value of each process when a plurality of processes is subjected to parallel processing. Here, the load value of each process is an index value representing the relative magnitude of a load of each process in the plurality of processes. For example, based on a timing at which each process performs inter-process communication when the plurality of processes is subjected to parallel processing, the information processing apparatus 101 measures the load value that represents the relative magnitude of the load of each process in the plurality of processes.

Here, for example, the information processing apparatus 101 performs test execution on the plurality of processes and causes the plurality of processors to perform parallel processing. At this time, the information processing apparatus 101 fixes the operating frequency of each processor to a specific operating frequency. The specific operating frequency is an operating frequency common to a plurality of processors, for example, a rated operating frequency.

Then, the information processing apparatus 101 measures, for example, a difference between times at which each process starts collective communication (inter-process communication) as the load value of each process. Note that the processors used for the test execution may be processors used for actual execution (for example, the processors pr1 to pr3), or may be another processor.

Here, for example, the information processing apparatus 101 measures, as the load value of each process, the difference between the earliest time among times at which each process starts collective communication and a time at which each process starts collective communication. The time at which each process starts collective communication is, for example, a time at which communication preparation for each process is completed (a time at which the collective communication became executable).

In the example of FIG. 1, processes 1, 2, 3 are assumed as processes to be executed. Each of the processes 1, 2, 3 is a process in which after executing a task A, collective communication is performed in the processes 1, 2, 3 and a task B is executed. However, the processing amount of each process 1, 2, 3 is different.

In this case, the information processing apparatus 101, for example, fixes the operating frequencies of the processors pr1 to pr3 and causes the processes 1, 2, 3 to be subjected to parallel processing as test execution. Then, the information processing apparatus 101 measures the load value of each process 1, 2, 3 based on a timing at which each process 1, 2, 3 performs collective communication.

Here, the load value of each process 1, 2, 3 represents the difference between the earliest time t3 among times t1, t2, t3 at which each process 1, 2, 3 starts collective communication and a time t, t2, t3 at which each process 1, 2, 3 starts collective communication. Thus, the magnitude relationship among the load values of the processes 1, 2, 3 is "load value of process 3<load value of process 1<load value of process 2". For example, among the processes 1, 2, 3, the process 2 has the highest load, and the process 3 has the lowest load.

Note that the process of calculating the time difference may be performed in each processor pr1 to pr3, or may be performed in the information processing apparatus 101.

For example, the processes 1, 2, 3 acquire the respective times t, t2, t3 to start the collective communication, and the processes 1, 2 transmit the acquired times t, t2 to the process 3. The process 3 compares the times t1, t2 transmitted from the processes 1, 2 with the time t3, and identifies the earliest time t3 among the times t1, t2, t3. Then, the process 3 transmits the identified time t3 to the processes 1, 2. Each of the processes 1, 2 calculates a difference between the time t3 transmitted from the process 3 and the times t1, t2 at which the own process starts collective communication. Further, the process 3 calculates the difference between the identified time t3 and the time t3 at which the own process starts collective communication. Then, each of the processes 1, 2, 3 transmits the calculated time difference to the information processing apparatus 101. Thus, the information processing apparatus 101 can measure the difference between the times transmitted from each of the processes 1, 2, 3 as the load value of each of the processes 1, 2.

(3) The information processing apparatus 101 determines the processor as the assignment destination of each process from the plurality of processors based on the maximum operating frequency of each processor and the measured load value of each process. Here, for example, the information processing apparatus 101 determines the processor as the assignment destination of each process so that the maximum operating frequency of the processor as the assignment destination is higher for a process having a larger load among the plurality of processes.

In the example of FIG. 1, the processor as the assignment destination of the process 2 having the largest load (load value) among the processes 1, 2, 3 is the processor pr3 having the highest maximum operating frequency. Further, the processor as the assignment destination of the process 1 having the second largest load among the processes 1, 2, 3 is the processor pr2 having the second highest maximum operating frequency. Furthermore, the processor as the assignment destination of the process 3 with the smallest load among the processes 1, 2, 3 is the processor pr1 having the lowest maximum operating frequency.

Note that the processes (1) and (2) described above may be performed in reverse order or may be performed in parallel.

As described above, by the information processing apparatus 101, it is possible to measure the maximum operating frequency of each processor capable of operating at an operating frequency higher than the rated operating frequency, in consideration of occurrence of performance variation during manufacturing of the processors. Further, by the information processing apparatus 101, it is possible to measure the load value that represents the relative magnitude of the load of each process in the plurality of processes, from a difference in the timing at which each process performs inter-process communication when the plurality of processes is subjected to parallel processing.

Then, by the information processing apparatus 101, it is possible to assign a process having a high load among the plurality of processes to a processor with higher performance by utilizing the performance variation of each processor that occurs during manufacturing of the processors. Thus, it is possible to prevent the parallel performance from being lowered by limiting to the speed of the process having the longest execution time among the plurality of processes, and to improve the parallel processing performance of the application having a poor load balance.

In the example of FIG. 1, the process 2 having the largest load among the processes 1, 2, 3 can be assigned to the processor pr3 having the highest maximum operating frequency, and thus it is possible to prevent the parallel performance from being lowered by limiting to the speed of the process 2, and to improve the parallel processing performance of the application (processes 1 to 3).

(Exemplary System Configuration of Information Processing System 200)

Next, an exemplary system configuration of the information processing system 200 according to the embodiment will be described. The information processing system 200 is a computer system including the information processing apparatus 101 illustrated in FIG. 1.

Figure 2:
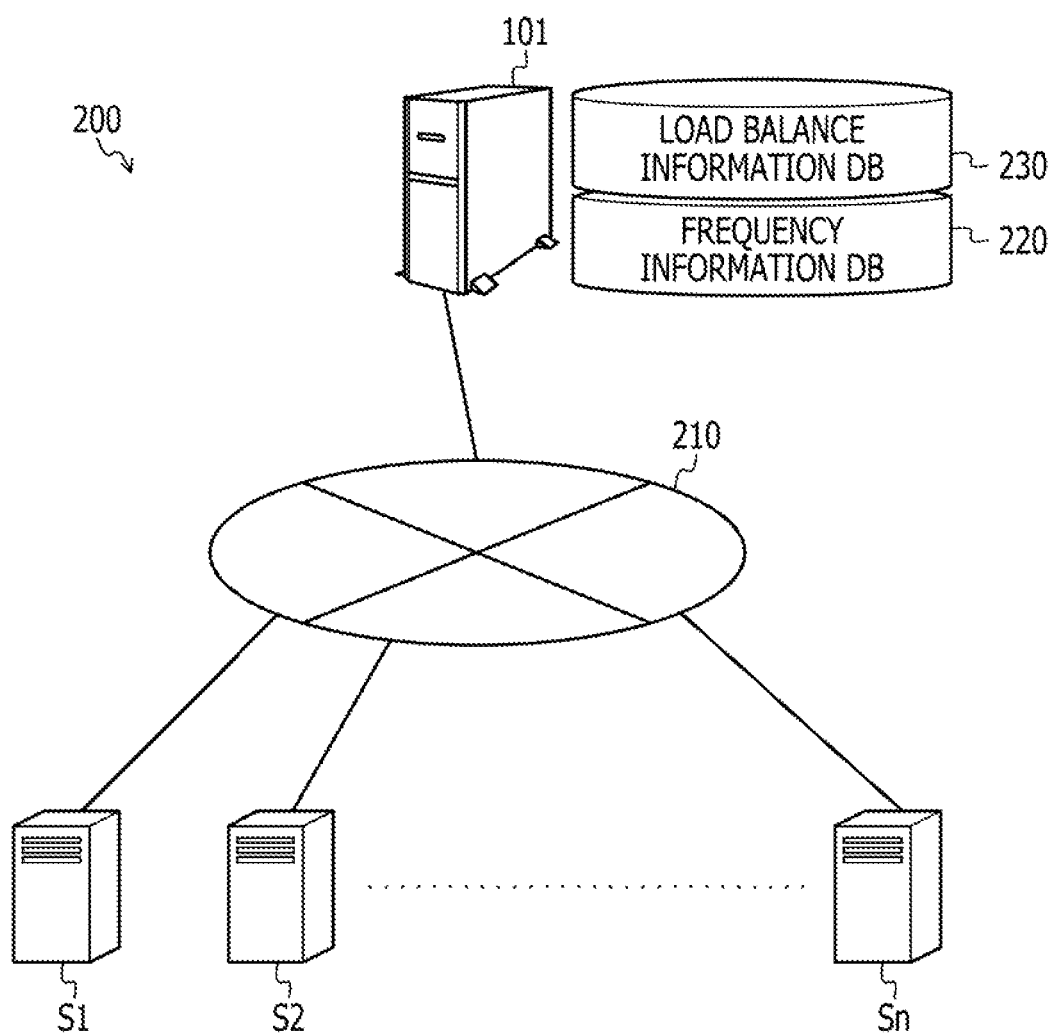
FIG. 2 is an explanatory diagram illustrating an exemplary functional configuration of an information processing system 200.

FIG. 2 is an explanatory diagram illustrating an exemplary system configuration of the information processing system 200. In FIG. 2, the information processing system 200 includes the information processing apparatus 101 and servers S1 to Sn (n: a natural number of 2 or more). In the information processing system 200, the information processing apparatus 101 and the servers S1 to Sn are connected via a wired or wireless network 210. Examples of the network 210 include a local area network (LAN), a wide area network (WAN), the Internet, and the like.

Here, the information processing apparatus 101 has a frequency information database (DB) 220 and a load balance information DB 230. The information processing apparatus 101 may be, for example, a server, or may be a PC. The contents stored in the frequency information DB 220 and the load balance information DB 230 will be described later with reference to FIGS. 4 and 5.

Each of the servers S1 to Sn is a computer that executes a process. In the information processing system 200, for example, a duster system is formed by the servers S1 to Sn. The servers S1 to Sn may be PCs, for example.

Note that although the information processing apparatus 101 is provided separately from the servers S1 to Sn here, the embodiment is not limited to this. For example, the information processing apparatus 101 may be achieved by any one of the servers S1 to Sn.

In the following description, an arbitrary server among the servers S1 to Sn may be referred to as "server Si" (i=1, 2, . . . , n).

(Exemplary Hardware Configuration of Information Processing Apparatus 101 or the Like)

Next, an exemplary hardware configuration of the information processing apparatus 101 and the server Si will be described. Here, the information processing apparatus 101 and the server Si are referred to as "information processing apparatus 101 or the like".

Figure 3:
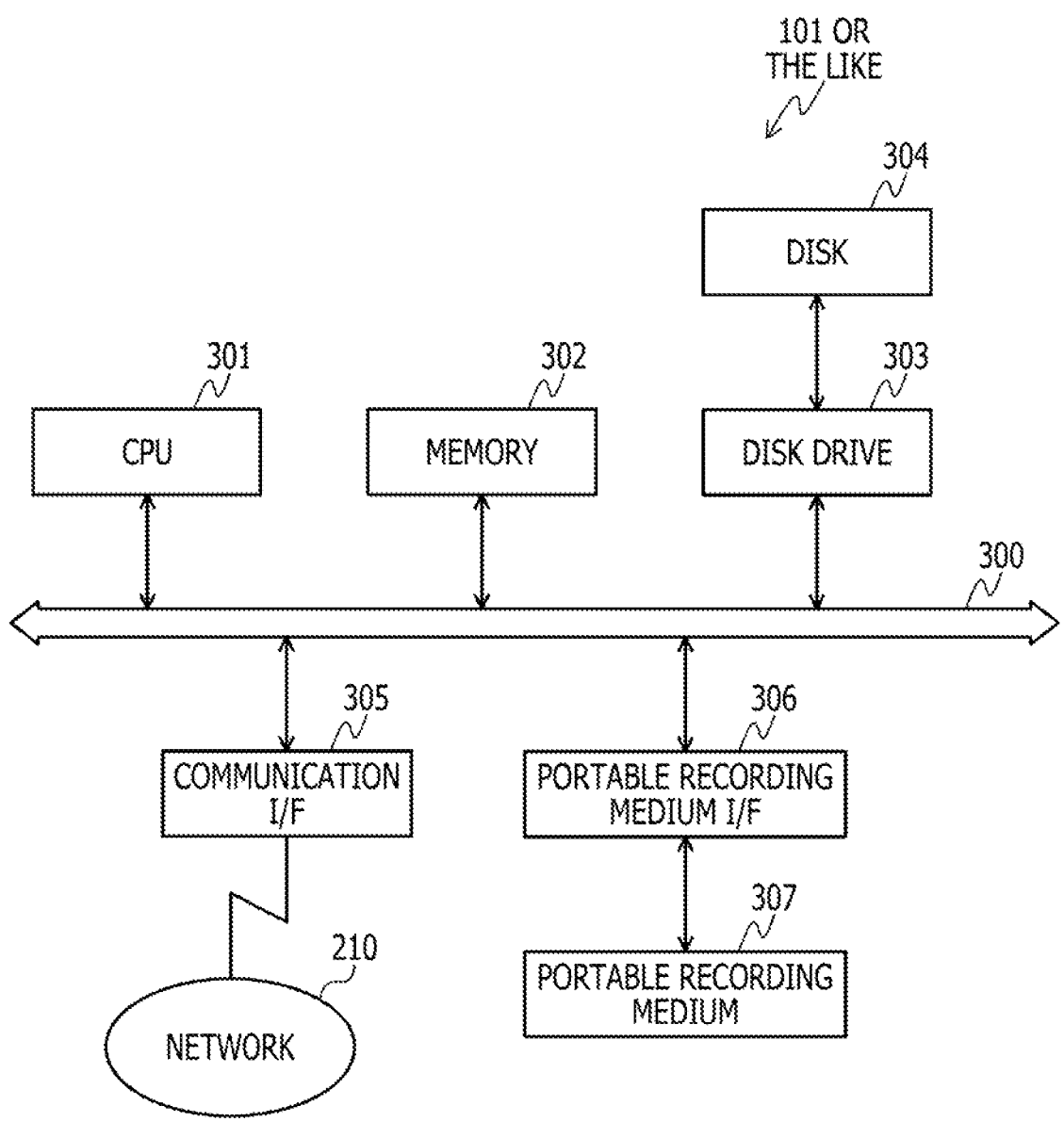

FIG. 3 is a block diagram illustrating an exemplary hardware configuration of the information processing apparatus 101 or the like. In FIG. 3, the information processing apparatus 101 or the like includes a CPU 301, a memory 302, a disk drive 303, a disk 304, a communication interface (I/F) 305, a portable recording medium I/F 306, and a portable recording medium 307. Furthermore, each of those components is interconnected by a bus 300.

Here, the CPU 301 performs overall control of the information processing apparatus 101 or the like. The CPU 301 may have a plurality of cores. The memory 302 includes, for example, a read only memory (ROM), a random access memory (RAM), a flash ROM, or the like. Here, for example, the flash ROM stores operating system (OS) programs, the ROM stores application programs, and the RAM is used as a work area for the CPU 301. A program stored in the memory 302 is loaded into the CPU 301 to cause the CPU 301 to execute a coded process.

The disk drive 303 controls reading and writing of data from and into the disk 304, under the control of the CPU 301. The disk 304 stores data written under the control of the disk drive 303. The disk 304 may be a magnetic disk, an optical disk, or the like, for example.

The communication I/F 305 is connected to the network 210 through a communication line, and is connected to another computer through the network 210. Further, the communication I/F 305 then manages an interface between the network 210 and the inside of the device, and controls input and output of data from an external computer. For example, a modem, a LAN adapter, or the like can be employed as the communication I/F 305.

The portable recording medium I/F 306 controls read and write of data from and into the portable recording medium 307 under the control of the CPU 301. The portable recording medium 307 stores data written under the control of the portable recording medium I/F 306. Examples of the portable recording medium 307 include a compact disc (CD)-ROM, a digital versatile disk (DVD), a universal serial bus (USB) memory, and the like.

Note that the information processing apparatus 101 or the like may have, for example, a solid state drive (SSD), an input device, a display, and the like in addition to the above-described components. Further, the information processing apparatus 101 or the like may not include, for example, the disk drive 303, the disk 304, the portable recording medium I/F 306, and the portable recording medium 307 among the above-described components.

The processors pr1 to pr3 illustrated in FIG. 1 correspond to the CPUs 301 of the servers S1 to Sn. The CPU 301 of each of the servers S1 to Sn is a processor capable of operating at an operating frequency higher than the rated operating frequency according to the temperature of the CPU 301, and the operating frequency increases as the temperature of the CPU 301 decreases, for example. Further, the rated operating frequencies of the CPUs 301 of the respective servers S1 to Sn are the same, for example.

(Contents Stored in Frequency Information DB 220 and Load Balance Information DB 230)

Next, the contents stored in the frequency information DB 220 and the load balance information DB 230 of the information processing apparatus 101 will be described with reference to FIGS. 4 and 5. The frequency information DB 220 and the load balance information DB 230 are formed with storage devices such as the memory 302 and the disk 304 of the information processing apparatus 101 illustrated in FIG. 3, for example.

Figure 4:
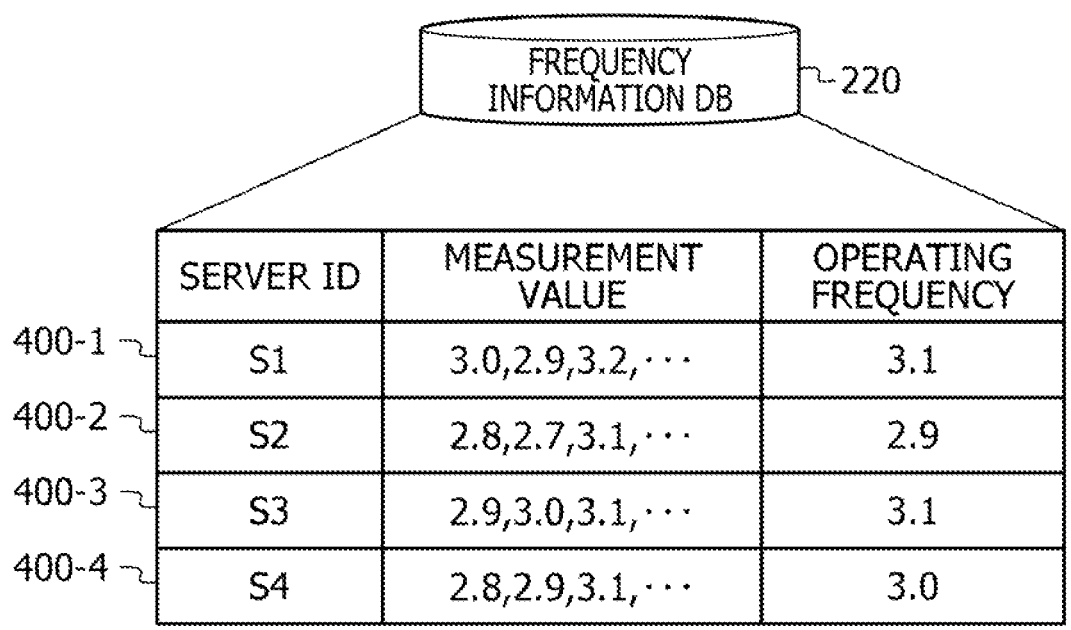
FIG. 4 is an explanatory diagram illustrating an example of contents stored in a frequency information DB 220.

FIG. 4 is an explanatory diagram illustrating an example of the contents stored in the frequency information DB 220. In FIG. 4, the frequency information DB 220 has fields of server IDs, measurement values, and operating frequencies, and stores records of the frequency information 400-1 through 400-4 by setting information in the respective fields.

Here, a server ID is the identifier that uniquely identifies the server Si. Here, the servers S1 to Sn are referred to as "servers S1 to S4" (n=4). A measurement value is the operating frequency obtained during measurement of the operating frequency of the CPU 301 of the server Si (unit: GHz). An operating frequency indicates a measurement result of the maximum operating frequency of the CPU 301 of the server Si (unit: GHz).

Note that the frequency information DB 220 may store the operating frequency of the processor (CPU 301 of the server Si) measured in advance. The storage unit 110 illustrated in FIG. 1 corresponds to, for example, the frequency information DB 220.

Figure 5:
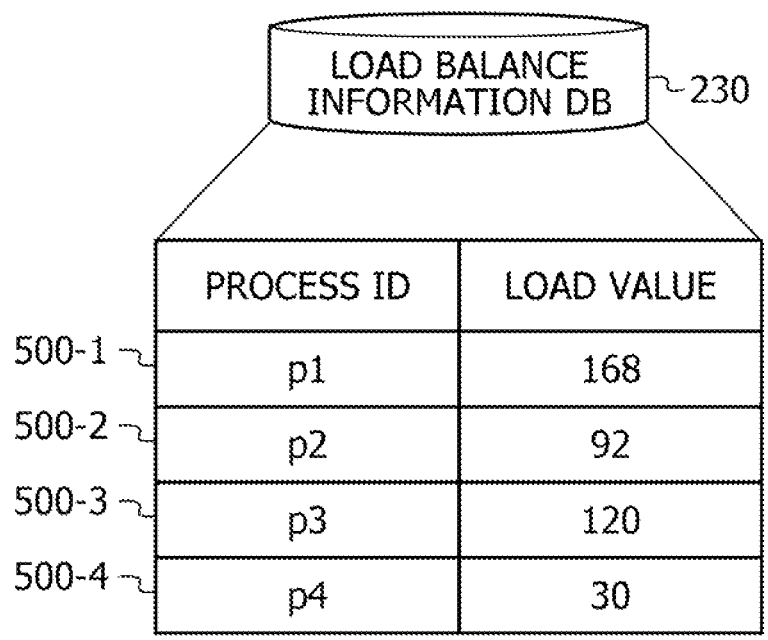
FIG. 5 is an explanatory diagram illustrating an example of contents stored in a load balance information DB 230.

FIG. 5 is an explanatory diagram illustrating an example of the contents stored in the load balance information DB 230. In FIG. 5, the load balance information DB 230 has fields of process IDs and load values, and stores records of the load balance information 500-1 through 500-4 by setting information in the respective fields.

Here, a process ID is an identifier that uniquely identifies a process. A load value is an index value representing the relative magnitude of the load of each process in the plurality of processes that implement an application. A larger load value of a process represents that the process has a relatively larger load among the plurality of processes.

(Exemplary Functional Configuration of Information Processing Apparatus 101)

Figure 6:
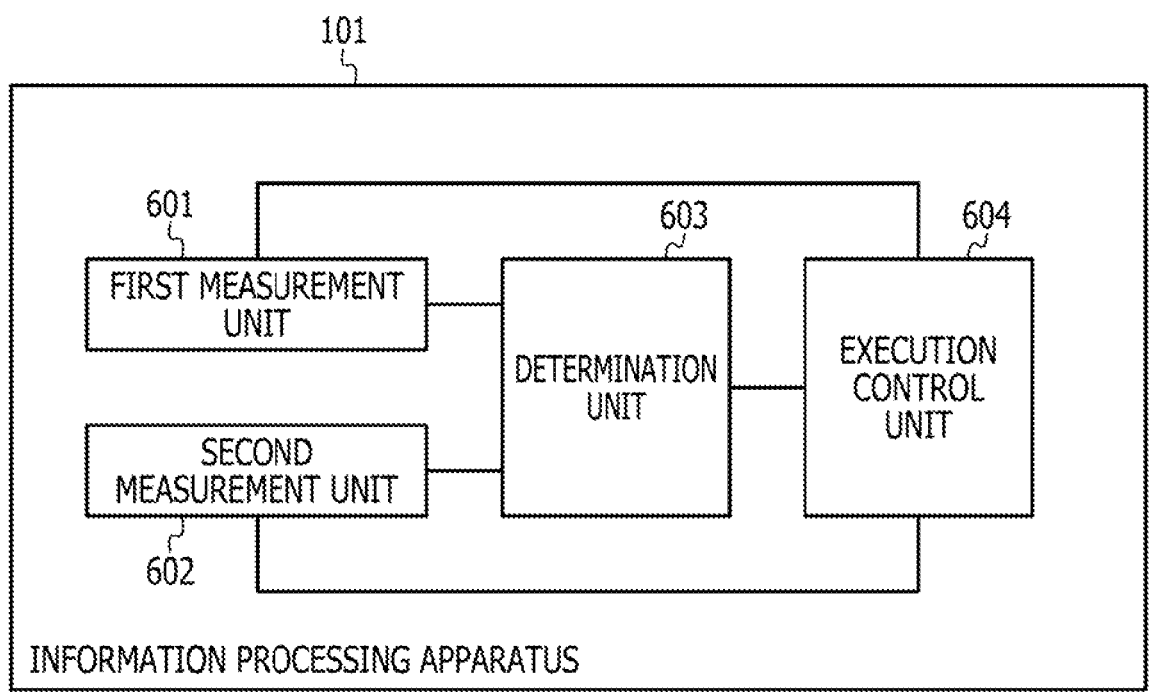
FIG. 6 is a block diagram illustrating an exemplary functional configuration of the information processing apparatus 101.

FIG. 6 is a block diagram illustrating an exemplary functional configuration of the information processing apparatus 101. In FIG. 6, the information processing apparatus 101 includes a first measurement unit 601, a second measurement unit 602, a determination unit 603, and an execution control unit 604. Here, for example, the first measurement unit 601 to the execution control unit 604 achieve the functions by causing the CPU 301 to execute the programs stored in a storage device such as the memory 302, the disk 304, or the portable recording medium 307 illustrated in FIG. 3, or through the communication I/F 305. The processing results of each functional unit are stored into a storage device such as the memory 302 or the disk 304, for example.

The first measurement unit 601 measures the maximum operating frequency of each processor of the plurality of processors. Each processor is, for example, the CPU 301 of the server Si. Here, for example, the first measurement unit 601 causes the CPU 301 of each of the servers S1 to Sn to execute a frequency measurement program. The frequency measurement program is a program in which, for example, not a memory access but an operation for obtaining the product of a matrix and a matrix is dominant.

Figure 7:
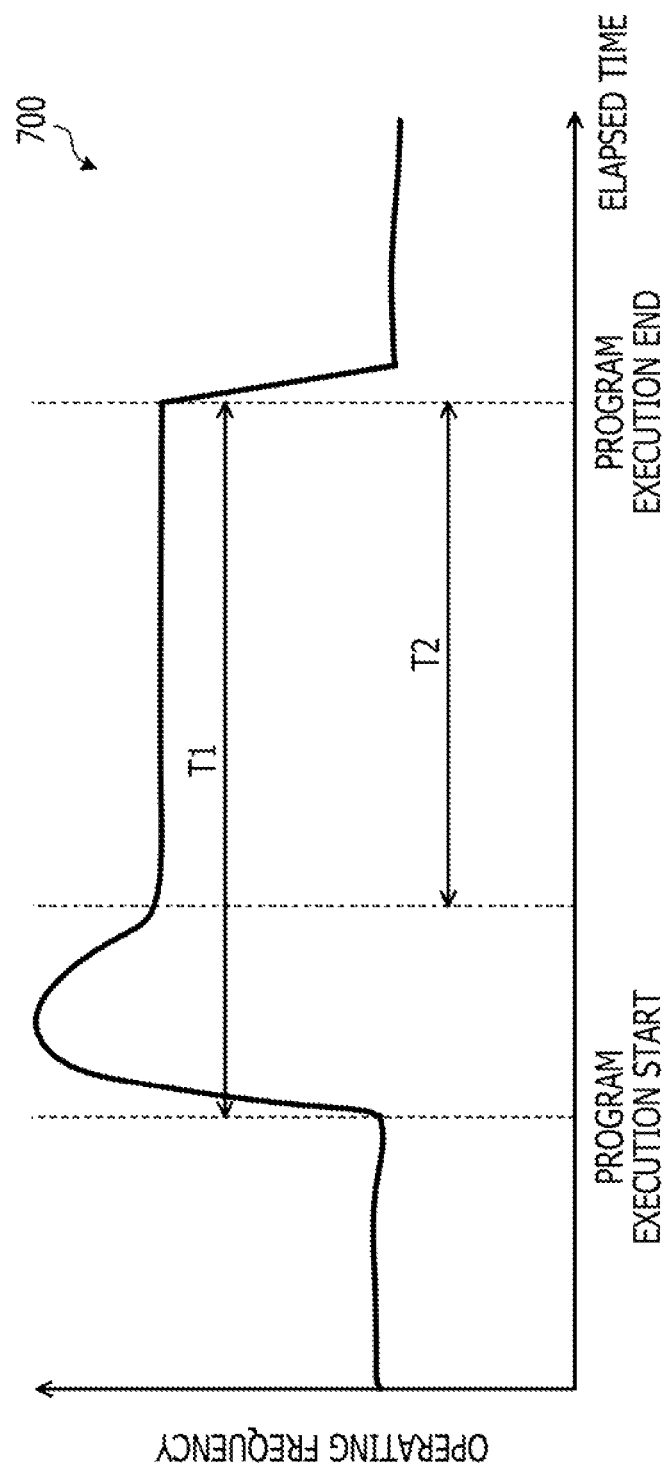
FIG. 7 is an explanatory diagram illustrating a specific example of a method for measuring a maximum operating frequency.

Next, the first measurement unit 601 acquires the operating frequency of the CPU 301 periodically (for example, every second) for a predetermined period using an existing command for each server Si. Note that the first measurement unit 601 may collectively acquire the operating frequency of the CPU 301 for every fixed time (for example, one second) during a predetermined period. The predetermined period is a measurement period of the operating frequency that can be set arbitrarily and is, for example, a period T1, T2 as illustrated in FIG. 7 described later.

For each server Si, the operating frequency acquired during the predetermined period is stored in, for example, the frequency information DB 220 illustrated in FIG. 4 in association with the server ID of each server Si. For example, for the server S1, the operating frequency acquired during the predetermined period is set in the measurement value field of the frequency information 400-1 in the frequency information DB 220.

Then, the first measurement unit 601 refers to the frequency information DB 220 and measures the average value of operating frequencies acquired during the predetermined period for each server Si as the maximum operating frequency of the CPU 301. Note that the first measurement unit 601 may measure, for example, the maximum operating frequency of the operating frequencies acquired during the predetermined period as the maximum operating frequency of the CPU 301.

The maximum operating frequency of the CPU 301 measured for each server Si is stored in, for example, the frequency information DB 220. For example, for the server S1, the measured maximum operating frequency of the CPU 301 is set in the operating frequency field of the frequency information 400-1 in the frequency information DB 220. However, the maximum operating frequency of each of the plurality of processors may be measured in advance and stored in the frequency information DB 220. In this case, the information processing apparatus 101 may not include the first measurement unit 601.

In the following description, the maximum operating frequency of the CPU 301 of the server Si may be referred to as the "maximum operating frequency of the server Si". Here, a specific example of a method for measuring the maximum operating frequency of the server Si will be described with reference to FIG. 7.

FIG. 7 is an explanatory diagram illustrating a specific example of the method for measuring the maximum operating frequency. In FIG. 7, a graph 700 illustrates an example of temporal changes in the operating frequency of the server Si when the frequency measurement program is executed by the server Si. Here, the first and second measurement methods will be described as the method for measuring the maximum operating frequency of the server Si.

In the first measurement method, the first measurement unit 601 measures, for each server Si, the average value of operating frequencies acquired during a period Ti as the maximum operating frequency of the CPU 301. The period T1 is a period from when execution of the frequency measurement program is started to when the execution ends in each server Si.

In the second measurement method, the first measurement unit 601 measures, for each server Si, the average value of operating frequencies acquired during a period T2 as the maximum operating frequency of the CPU 301. The period T2 is a period from when a steady state is reached after starting execution of the frequency measurement program to when the execution ends in each server Si.

According to the second measurement method, the maximum operating frequency of each server Si may be measured based on the operating frequency after the change in the operating frequency has settled down. For example, according to the second measurement method, the maximum operating frequency of each server Si may be measured excluding the period immediately after the start of execution in which a high operating frequency is likely to occur due to the low temperature of the CPU 301.

Note that in the example of FIG. 7, the ends of the respective periods T1, T2 are times at which the execution of the frequency measurement program ends, but the embodiment is not limited to this. For example, the ends of the respective periods T1, T2 may be set to a time point before the execution of the frequency measurement program ends.

Returning to the description of FIG. 6, the second measurement unit 602 measures a load value of each process based on the timing at which each process performs inter-process communication when the plurality of processes is subjected to parallel processing. Here, the plurality of processes is a set of processes that implements an application as an execution target to be subjected to parallel processing by the servers S1 to Sn. The load value of each process is an index value representing the relative magnitude of the load of each process in the plurality of processes.

In the following description, the application to be executed may be referred to as the "execution target application AP", and a plurality of processes that implements the execution target application AP may be referred to as "processes p1 to pm" (m is a natural number of 2 or more). Further, any process among the processes p1 to pm may be referred to as a "process p".

Here, in many programs operating with a plurality of processes, collective communication of a message passing interface (MPI) is called. Therefore, the second measurement unit 602 hooks the MPI function in each process p to acquire load information of each process p, for example. The load information is, for example, information indicating the difference between the earliest time among times at which each of the processes p1 to pm starts collective communication and a time at which each process p starts collective communication.

Here, for example, the second measurement unit 602 fixes the operating frequencies of the servers S1 to Sn and performs a test execution of the execution target application AP, thereby causing the servers S1 to Sn to perform parallel processing of the processes p1 to pm. At this time, the second measurement unit 602 hooks the MPI function in each process p and executes a code that checks the load balance at the time of executing collective communication in each process p, thereby acquiring the load information of each process p.

Note that the server as the assignment destination of each process p at the time of test execution can be set arbitrarily. For example, the second measurement unit 602 may set the server as the assignment destination of each process p so that the number of processes assigned to each server Si is equal. At this time, the second measurement unit 602 may sequentially set the process having a younger process ID from the server having a younger server ID.

Here, an example of acquiring the load information of each process p will be described with reference to FIG. 8.

Figure 8:
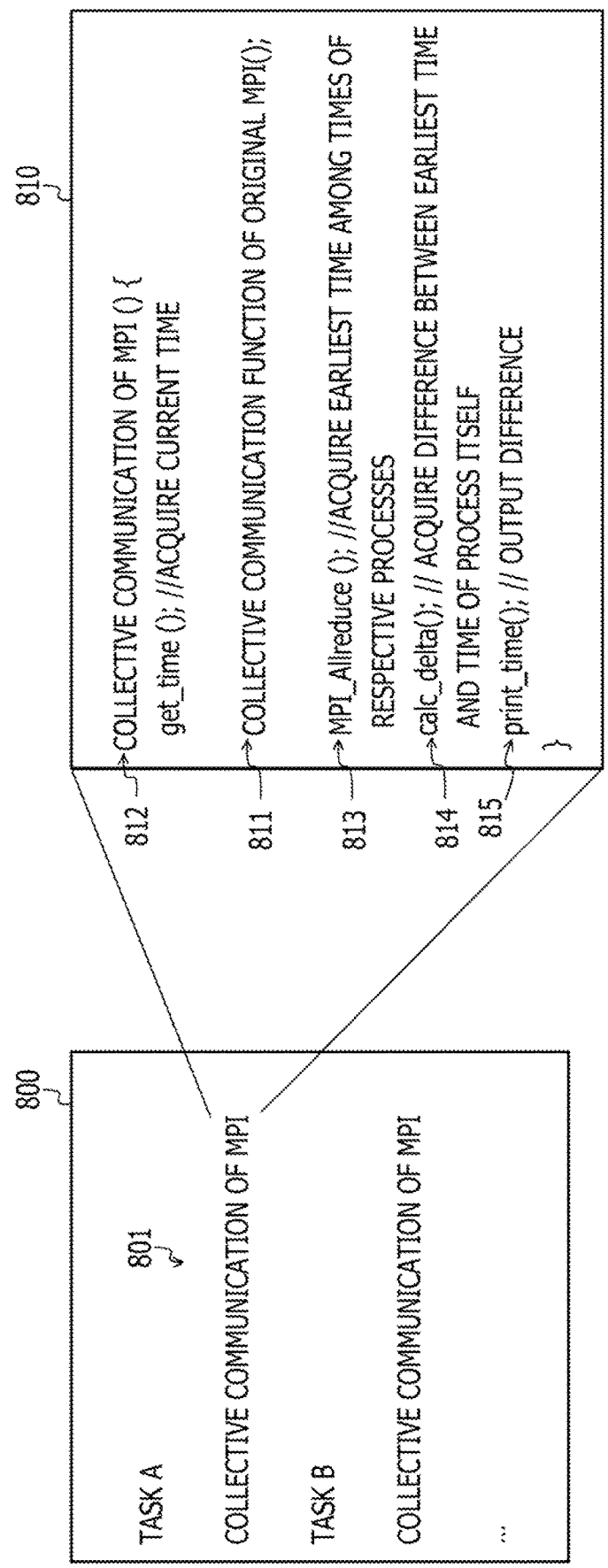
FIG. 8 is an explanatory diagram illustrating an example of obtaining load information of each process.

FIG. 8 is an explanatory diagram illustrating an example of acquiring the load information of each process. In FIG. 8, an execution flow 800 schematically illustrates a flow of execution of each process p in the server Si. In each process p, the collective communication of the MPI is performed after performing the task A, and the collective communication of the MPI is performed after performing the task B.

Here, a function 801 that performs the collective communication of the MPI during the execution flow 800 is hooked, and processes as illustrated in the function information 810 are executed at the time of executing the collective communication. Further, functions 812 to 815 are added before and after a function 811 that performs the original MPI collective communication. The function 812 is a function for acquiring the current time.

The function 813 is a function (Allreduce) that acquires the earliest time among the times at which the processes p1 to pm start collective communication. The function 814 is a function that acquires the difference between the earliest time among times at which each of the processes p1 to pm starts the collective communication and a time (current time)

at which the process itself (each process) starts the collective communication. The function 815 is a function that outputs a difference.

Thus, without changing the source code of each process p, by hooking the MPI function and executing the code that checks the load balance at the time of executing the collective communication, the load information of each process p may be acquired with low overhead.

However, collective communication may be performed multiple times in each process p. In this case, the second measurement unit 602 measures the total value of time differences acquired for each process p as the load value of each process p. Note that when the collective communication is performed only once in each process p, the second measurement unit 602 measures a time difference acquired for each process p as the load value of each process p.

Note that the measured load value of the process p (the total value of time differences) is stored in the load balance information DB 230 illustrated in FIG. 5 in association with the process ID of the process, for example.

The determination unit 603 determines, from the plurality of processors, the processor as the assignment destination of each process based on the maximum operating frequency of each processor measured by the first measurement unit 601 and the load value of each process measured by the second measurement unit 602. However, the maximum operating frequency of each processor may be measured in advance and stored in the frequency information DB 220. In this case, the determination unit 603 identifies the maximum operating frequency of each processor by referring to the frequency information DB 220, for example.

Here, for example, the determination unit 603 determines the server Si as the assignment destination of each process p so that the maximum operating frequency of the server (CPU 301) as the assignment destination is higher for the process p having a larger load among the processes p1 to pm.

Here, for example, the determination unit 603 refers to the frequency information DB 220 and arranges the server IDs in descending order of the maximum operating frequencies. Further, the determination unit 603 refers to the load balance information DB 230 and arranges the process IDs in descending order of the load values. Then, the determination unit 603 assigns to the server ID having the highest maximum operating frequency in order from the process ID having the highest load value.

Thus, the server Si as the assignment destination of each process p may be determined so that the maximum operating frequency of the server (CPU 301) as the assignment destination is higher for the process p having a larger load among the processes p1 to pm.

As an example, it is assumed that the number of servers S1 to Sn is "4" (n=4), and the number of processes p1 to pm is "8" (m=8). Further, it is assumed that the servers S1 to S4 arranged in descending order of the maximum operating frequencies are "S4⇒S3⇒S2⇒S1". It is assumed that the processes p1 to p8 arranged in descending order of the load values are "p8⇒p7⇒p6⇒p5⇒p4⇒p3⇒p2⇒p1".

For example, the determination unit 603 may determine the server Si as the assignment destination of each process p by sequentially assigning two by two from the process p having the highest load value to the server Si having a high maximum operating frequency. In this case, the server Si as the assignment destination of the processes p8, p7 is the server S4. The server Si as the assignment destination of the processes p6, p5 is the server S3. The server Si as the assignment destination of the processes p4, p3 is the server S2. The server Si as the assignment destination of the processes p2, p1 is the server S1.

Further, the determination unit 603 may determine the server Si as the assignment destination of each process p by sequentially assigning one by one from the process p having the highest load value to the server Si having a highest maximum operating frequency. In this case, the server Si as the assignment destination of the processes p8, p4 are assigned is the server S4. The server Si as the assignment destination of the processes p7, p3 is the server S3. The server Si as the assignment destination of the processes p6, p2 is the server S2. The server Si as the assignment destination of the processes p5, p1 is the server S1.

The execution control unit 604 assigns each process to the processor as the assignment destination determined by the determination unit 603, and causes the plurality of processors to perform parallel processing of the plurality of processes. Here, for example, the execution control unit 604 assigns each process p to the determined server Si as the assignment destination and causes the servers S1 to Sn to perform parallel processing of the processes p1 to pm.

Note that in the above description, the execution target application AP is test-executed to measure the load value of each process p, but the embodiment is not limited to this. For example, the information processing apparatus 101 may measure the load value of each process p when the execution target application AP is actually executed. However, in this case, the information processing apparatus 101 fixes the operating frequencies of the servers S1 to Sn and causes the servers S1 to Sn to perform parallel processing of the processes p1 to pm. For example, the information processing apparatus 101 executes the first few percent to several tens percent of the entire processing of the execution target application AP with the operating frequencies of the servers S1 to Sn fixed, and measures the load value of each process p. Thereafter, the information processing apparatus 101 may switch to the method of improving the operating frequency to the limit by determining the server Si as the assignment destination of each process p based on the measured load value of each process p, and then execute the remaining processing.

Further, in the above description, the first measurement unit 601 calculates the average value of the operating frequencies acquired for each server Si during a predetermined period (for example, during the periods T1, T2), to thereby measure the maximum operating frequency of each server Si, but the embodiment is not limited thereto. For example, each server Si may be configured to calculate an average value of operating frequencies during a predetermined period. Then, the first measurement unit 601 may measure the maximum operating frequency of each server Si by acquiring the average value of the operating frequencies from each server Si.

Further, in the above description, the second measurement unit 602, for each process p, calculates the total value of acquired time differences to thereby measure the load value of each process p, but the embodiment is not limited thereto. For example, in each server Si, the total value of time differences acquired at the time of executing the collective communication may be calculated. Then, the second measurement unit 602 may acquire the total value of time differences from each server Si, to thereby measure the load value of each process p. [0110] (One operation example of information processing system 200)

Next, an operation example of the information processing system 200 will be described with reference to FIG. 9. Here, it is assumed that the number of servers S1 to Sn is "4"

(n=4), and the number of processes p1 to pm of the execution target application AP is "4" (m=4).

Figure 9:
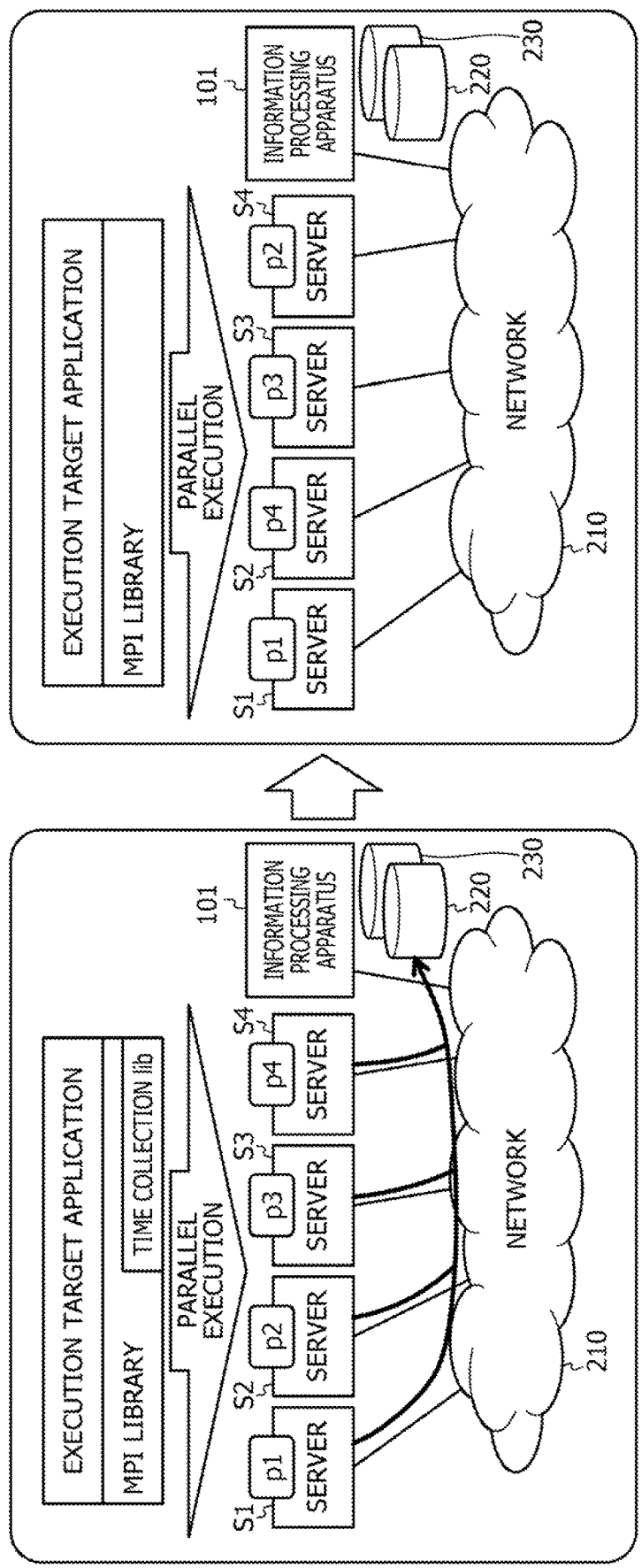
FIG. 9 is an explanatory diagram illustrating an operation example of the information processing system 200.

FIG. 9 is an explanatory diagram illustrating an operation example of the information processing system 200. In FIG. 9, the information processing apparatus 101 causes each of the servers S1 to S4 to execute the frequency measurement program and measures the maximum operating frequency of each of the servers S to S4. Consequently, the frequency information 400-1 to 400-4 of each of the servers S1 to S4 is stored in the frequency information DB 220 (see FIG. 4).

Further, the information processing apparatus 101 performs test execution of the execution target application AP and causes the servers S1 to S4 to perform parallel processing of the processes p1 to p4, to thereby measure the load value of each of the processes p1 to p4. Here, in order to equalize the number of processes assigned to each of the servers S1 to S4, one process with a younger process ID is sequentially assigned to a server with a younger server ID.

Here, for example, the information processing apparatus 101 hooks the MPI function in each of the processes p1 to p4 and executes the code that checks the load balance at the time of executing the collective communication in each of the processes p1 to p4, to thereby acquire the load information of each of the processes p1 to p4. Consequently, the load balance information 500-1 to 500-4 of each of the servers S1 to S4 is stored in the load balance information DB 230 (see FIG. 5).

Then, the information processing apparatus 101 determines the server as the assignment destination of each of the processes p1 to p4 from the servers S1 to S4 based on the measured maximum operating frequencies of the servers S1 to S4 and the measured load value of each of the processes p1 to p4. Here, for example, the information processing apparatus 101 refers to the frequency information DB 220 and the load balance information DB 230, and determines the server as the assignment destination of each of the processes p1 to p4 so that the maximum operating frequency of the server as the assignment destination is higher for the process having a larger load (load value) among the processes p1 to p4.

Here, the process p1 having the largest load among the processes p1 to p4 is assigned to the server S having the highest maximum operating frequency. Further, the process p3 having the second largest load is assigned to the server S3 having the same maximum operating frequency as the server S1. Further, the process p2 having the third largest load is assigned to the server S4 having the third highest maximum operating frequency. Further, the process p4 having the smallest load is assigned to the server S2 having the lowest maximum operating frequency.

Thus, it is possible to assign a process with a high load to the high performance CPU 301 by utilizing the performance variation of the CPU 301 of each of the servers S1 to S4, and to improve the parallel processing performance of the execution target application AP with a poor load balance.

(Various Processing Procedures of Information Processing Apparatus 101)

Next, various processing procedures of the information processing apparatus 101 will be described. First, an operating frequency measurement processing procedure of the information processing apparatus 101 will be described with reference to FIG. 10. An operating frequency measurement process is performed, for example, when the computer system including the servers S1 to Sn is introduced.

Operating Frequency Measurement Processing Procedure of Information Processing Apparatus 101

Figure 10:
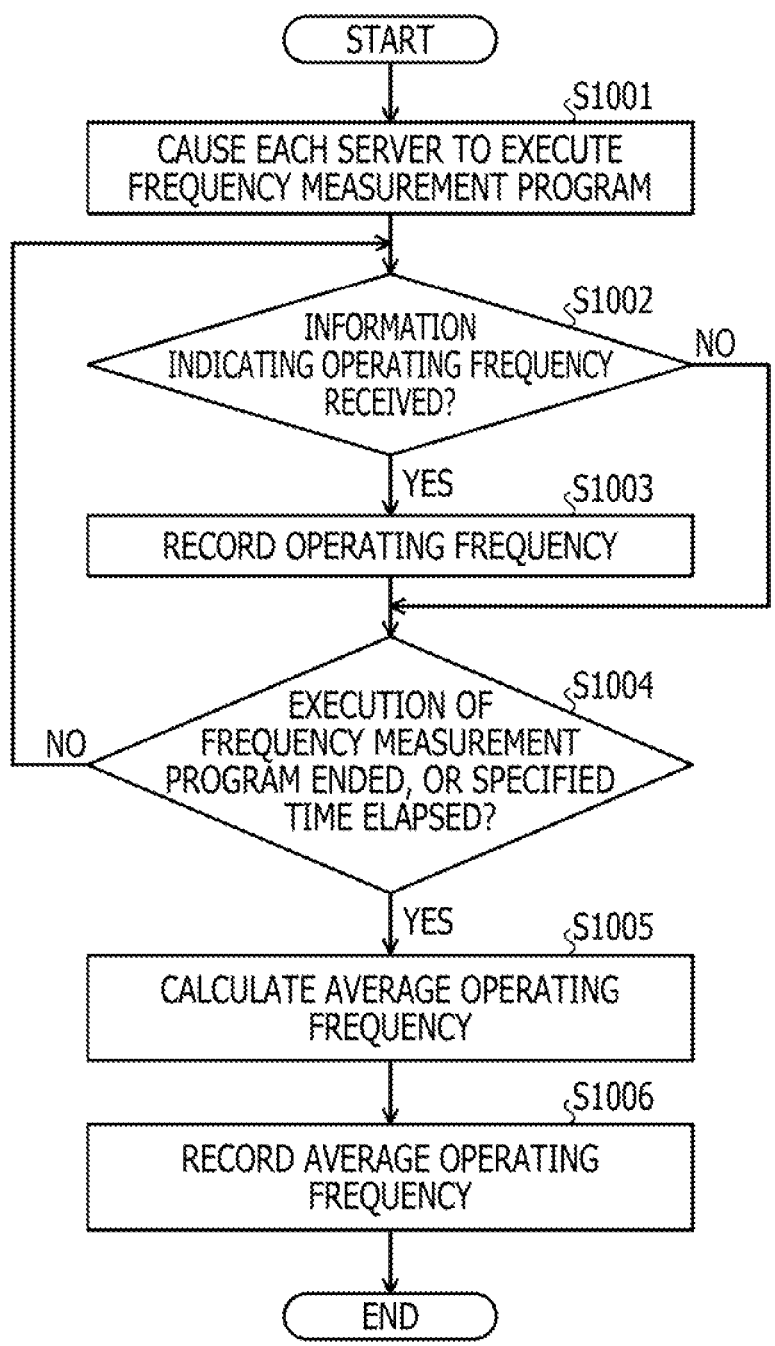
FIG. 10 is a flowchart illustrating an example of an operating frequency measurement processing procedure of the information processing apparatus 101.

FIG. 10 is a flowchart illustrating an example of the operating frequency measurement processing procedure of the information processing apparatus 101. In the flowchart of FIG. 10, first, the information processing apparatus 101 causes each of the servers S1 to Sn to execute the frequency measurement program (step S1001).

Next, the information processing apparatus 101 determines whether or not information indicating the operating frequency of the server Si has been received from the server Si (step S1002). Note that it is assumed here that the operating frequency of the server Si is periodically acquired during a predetermined period (for example, the periods T1, T2 illustrated in FIG. 7).

Here, when the information indicating the operating frequency is not received from the server Si (step S1002: No), the information processing apparatus 101 proceeds to step S1004. On the other hand, when the information indicating the operating frequency is received from the server Si (step S1002: Yes), the information processing apparatus 101 records the operating frequency indicated by the information in the frequency information DB 220 in association with the server ID of the server Si (step S1003).

Then, the information processing apparatus 101 determines whether or not the execution of the frequency measurement program on the servers S1 to Sn has ended, or whether or not a specified time has elapsed since the start of the execution of the frequency measurement program on the servers S1 to Sn (step S1004). Here, when the execution of the frequency measurement program has not ended and the specified time has not elapsed (step S1004: No), the information processing apparatus 101 returns to step S1002.

On the other hand, when the execution of the frequency measurement program has ended, or when the specified time has elapsed (step S1004: Yes), the information processing apparatus 101 refers to the frequency information DB 220 and calculates the average operating frequency of each server Si (Step S1005). Then, the information processing apparatus 101 records the calculated average operating frequency of each server Si in the frequency information DB 220 in association with the server ID of each server Si (step S1006), and ends the series of processes according to this flowchart.

Thus, the maximum operating frequency of the CPU 301 of each of the servers S1 to Sn may be measured.

Note that in step S1002, the information processing apparatus 101 may acquire, from the server Si, information collectively indicating the operating frequency of the server Si for every fixed time during a predetermined period. Further, the information processing apparatus 101 may acquire information indicating the average operating frequency of the server Si during the predetermined period from the server Si. For example, the average operating frequency of the server Si during the predetermined period may be calculated on the server Si side.

Load Balance Measurement Processing Procedure of Information Processing Apparatus 101

Next, a load balance measurement processing procedure of the information processing apparatus 101 will be described with reference to FIG. 11. The load balance measurement process is performed, for example, for every execution target application AP.

Figure 11:
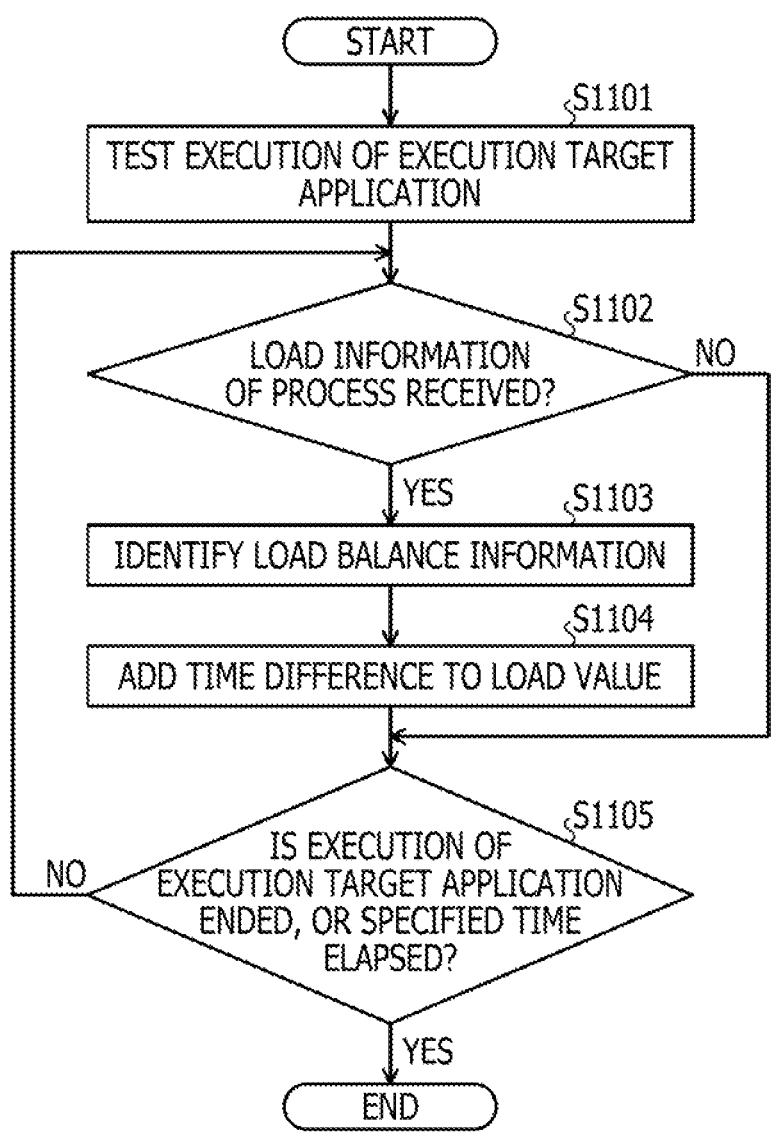
FIG. 11 is a flowchart illustrating an example of a load balance measurement processing procedure of the information processing apparatus 101.

FIG. 11 is a flowchart illustrating an example of the load balance measurement processing procedure of the information processing apparatus 101. In the flowchart of FIG. 11, first, the information processing apparatus 101 performs a test execution of the execution target application AP on the servers S1 to Sn, thereby causing the servers S1 to Sn to perform parallel processing of the processes p1 to pm (step S1101). At this time, the operating frequencies of the respective servers S1 to Sn are fixed values (for example, rated operating frequencies).

Next, the information processing apparatus 101 determines whether or not the load information of the process p has been received from the server Si (step S1102). The load information of the process p is information indicating the difference between the earliest time among times at which each of the processes p1 to pm starts collective communication and a time at which each process p starts collective communication.

Note that, here, it is assumed that the load information of each process p is acquired from the server Si at the time of executing collective communication in each process p.

Here, when the load information of the process p has not been received (step S1102: No), the information processing apparatus 101 proceeds to step S1105. On the other hand, when the load information of the process p is received (step S1102: Yes), the information processing apparatus 101 refers to the load balance information DB 230 and identifies load balance information corresponding to the process ID of the process p (step S1103).

Note that when the load balance information corresponding to the process ID of the process p does not exist, the information processing apparatus 101 creates the load balance information corresponding to the process ID of the process p in the load balance information DB 230 as a new record.

Then, the information processing apparatus 101 adds a time difference indicated by the received load information of the process p to the load value of the identified load balance information (step S1104). Next, the information processing apparatus 101 determines whether or not the test execution of the execution target application AP on the servers S1 to Sn has ended, or whether a specified time has elapsed since the start of execution of the execution target application AP (Step S1105).

Here, when the execution of the execution target application AP has not ended and the specified time has not elapsed (step S1105: No), the information processing apparatus 101 returns to step S1102. On the other hand, when the execution of the execution target application AP has ended or when the specified time has elapsed (step S1105: Yes), the information processing apparatus 101 ends the series of processes according to this flowchart.

Thus, it is possible to measure the load value representing the relative magnitude of the load of each process p in the processes p1 to pm.

Note that in step S1102, the information processing apparatus 101 may collectively acquire, from the server Si, the load information of the process p acquired each time collective communication is performed during execution of the execution target application AP. Further, the information processing apparatus 101 may acquire information indicating the total value of time differences checked at the time of executing the collective communication of each process p from the server Si. For example, the total value (load value) of time differences that occur for every collective communication in each process p may be calculated on the server Si side.

Execution Control Processing Procedure of Information Processing Apparatus 101

Next, the execution control processing procedure of the information processing apparatus 101 will be described with reference to FIGS. 12 and 13. The execution control process is executed, for example, in response to an execution start instruction for the execution target application AP from a user. The execution start instruction for the execution target application AP may be performed using, for example, an input device (not illustrated) of the information processing apparatus 101, or may be received from another computer different from the information processing apparatus 101.

Figure 12:
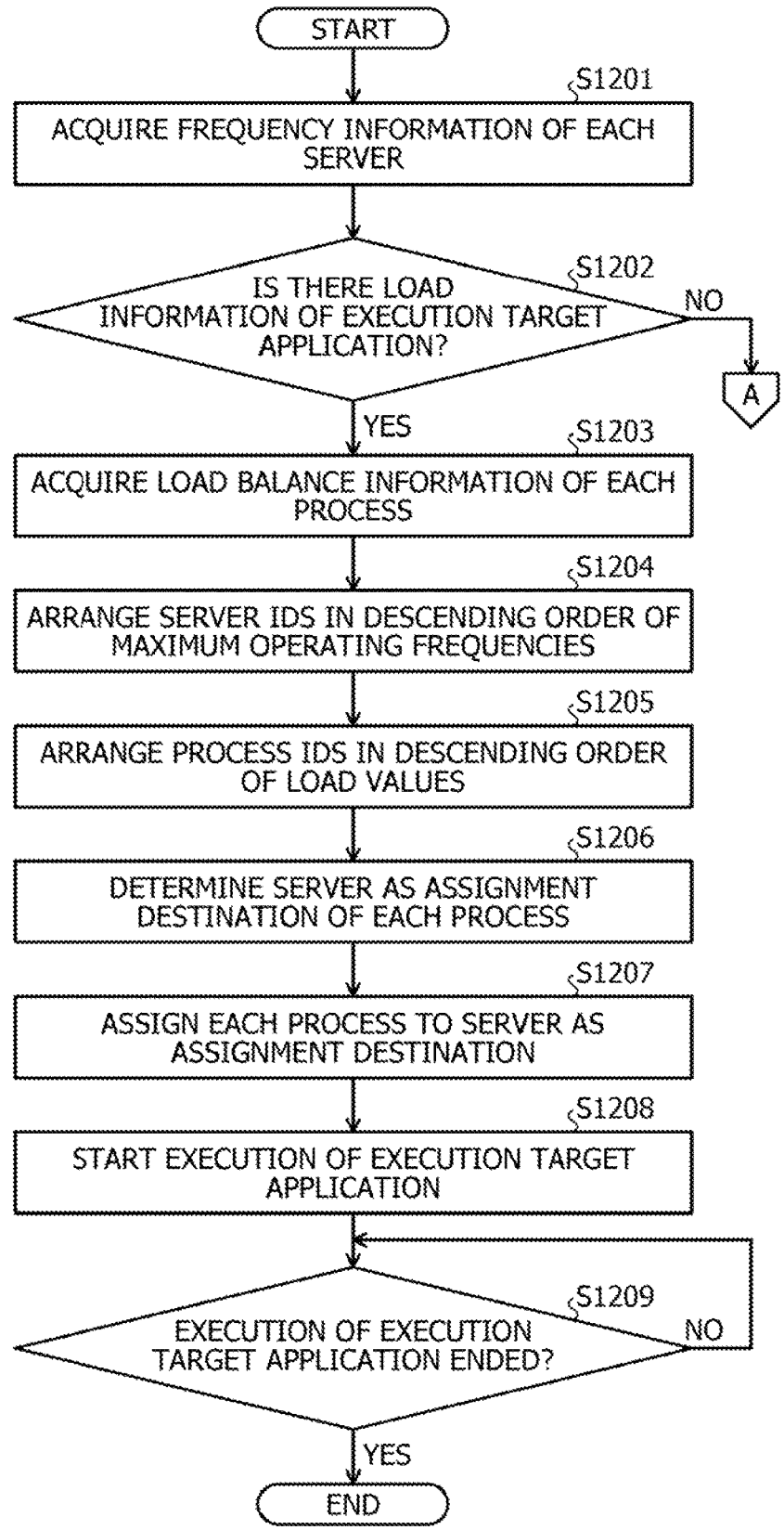
FIG. 12 is a flowchart (part 1) illustrating an example of an execution control processing procedure of the information processing apparatus 101.
Figure 13:
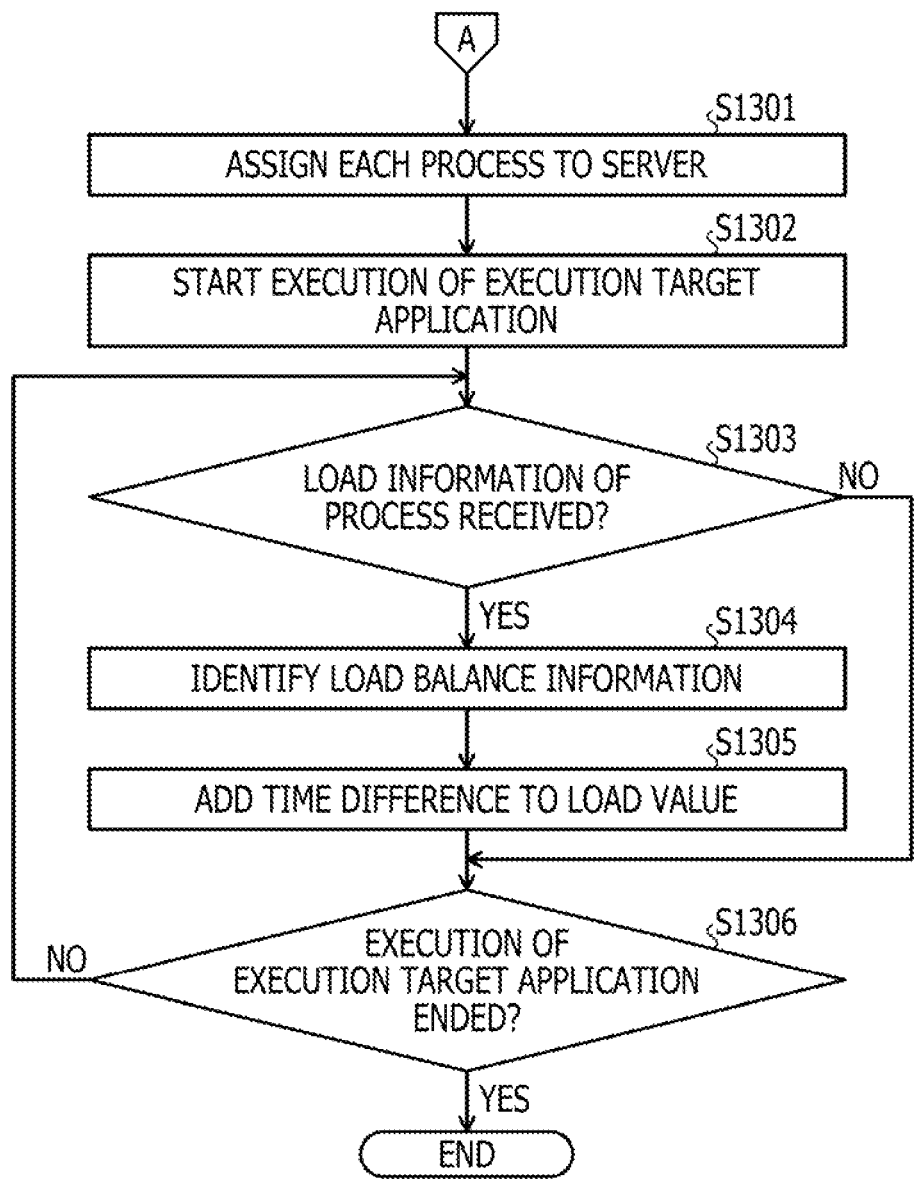
FIG. 13 is a flowchart (part 2) illustrating an example of the execution control processing procedure of the information processing apparatus 101.

FIGS. 12 and 13 are flowcharts illustrating an example of the execution control processing procedure of the information processing apparatus 101. In the flowchart of FIG. 12, the information processing apparatus 101 first refers to the frequency information DB 220 and acquires the frequency information of each of the servers S1 to Sn (step S1201).

Next, the information processing apparatus 101 refers to the load balance information DB 230 and determines whether or not there is load information of the execution target application AP (step S1202). Here, when there is load information of the execution target application AP (step S1202: Yes), the information processing apparatus 101 refers to the load balance information DB 230 to acquire the load balance information of each process p1 to pm of the execution target application AP (step S1203).

Then, the information processing apparatus 101 refers to the acquired frequency information of each of the servers S1 to Sn and arranges the server IDs in descending order of the maximum operating frequency (step S1204). Next, the information processing apparatus 101 refers to the acquired load balance information of each of the processes p1 to pm and arranges the process IDs in descending order of load values (step S1205).

Then, the information processing apparatus 101 determines the server Si as the assignment destination of each process p by allocating to the server ID having a high maximum operating frequency in order from the process ID having a high load value (step S1206). Next, the information processing apparatus 101 assigns each process p to the determined server Si as the assignment destination (step S1207).

Then, the information processing apparatus 101 starts execution of the execution target application AP and causes the servers S1 to Sn to perform parallel processing of the processes p1 to pm (step S1208). Next, the information processing apparatus 101 determines whether or not the execution of the execution target application AP has ended (step S1209).

Here, the information processing apparatus 101 waits for the execution of the execution target application AP to end (step S1209: No). Then, when the execution of the execution target application AP has ended (step S1209: Yes), the information processing apparatus 101 ends the series of processes according to this flowchart.

Further, when there is no load information of the execution target application AP in step S1202 (step S1202: No), the information processing apparatus 101 moves to step S1301 illustrated in FIG. 13.

In the flowchart of FIG. 13, the information processing apparatus 101 first assigns the respective processes p1 to pm of the execution target application AP to the servers S1 to Sn so that the numbers of processes assigned to the each server Si become equal (step S1301).

Next, the information processing apparatus 101 starts execution of the execution target application AP on the servers S1 to Sn and causes the servers S1 to Sn to perform parallel processing of the processes p1 to pm (step S1302).

At this time, the operating frequencies of the respective servers S1 to Sn are fixed values (for example, rated operating frequencies).

Next, the information processing apparatus 101 determines whether or not the load information of the process p has been received from the server Si (step S1303). Here, when the load information of the process p is not received (step S1303: No), the information processing apparatus 101 moves to step S1306.

On the other hand, when the load information of the process p is received (step S1303: Yes), the information processing apparatus 101 refers to the load balance information DB 230 and identifies the load balance information corresponding to the process ID of the process p (step S1304).

Note that when the load balance information corresponding to the process ID of the process p does not exist, the information processing apparatus 101 creates the load balance information corresponding to the process ID of the process p in the load balance information DB 230 as a new record.

Then, the information processing apparatus 101 adds a time difference indicated by the received load information of the process p to the load value of the identified load balance information (step S1305). Next, the information processing apparatus 101 determines whether or not the execution of the execution target application AP has ended (step S1306).

Here, when the execution of the execution target application AP has not ended (step S1306: No), the information processing apparatus 101 returns to step S1303. On the other hand, when the execution of the execution target application AP has ended (step S1306: Yes), the information processing apparatus 101 ends the series of processes according to this flowchart.

Thus, it is possible to assign the process p with a high load to the high performance CPU 301 (server Si) by utilizing the performance variation of the CPU 301 of each of the servers S1 to Sn, and to improve the parallel processing performance of the execution target application AP with a poor load balance. Further, when the load information of the execution target application AP is not created in advance, the load value of each process p may be measured when the execution target application AP is first executed.

As described above, with the information processing apparatus 101 according to the embodiment, it is possible to measure the maximum operating frequency of each server Si (CPU 301) of the servers S1 to Sn. However, the CPU 301 of each server Si is a processor capable of operating at an operating frequency higher than the rated operating frequency according to the temperature of the CPU 301. For example, the operating frequency of the CPU 301 increases as the temperature of the CPU 301 decreases. Further, the maximum operating frequency of each server Si (CPU 301) may be measured in advance and stored in the frequency information DB 220. In this case, the information processing apparatus 101 can identify the maximum operating frequency of each server Si (CPU 301) by referring to the frequency information DB 220.

Further, by the information processing apparatus 101, it is possible to measure the load value representing the relative magnitude of the load of each process p when the processes p1 to pm are subjected to parallel processing. For example, the information processing apparatus 101 measures the load value of each process p based on the timing at which each process p performs collective communication when the processes p1 to pm are subjected to parallel processing. Further, by the information processing apparatus 101, the server Si as the assignment destination of each process p is determined from the servers S1 to Sn based on the measured maximum operating frequency of each server Si and the measured load value of each process p. Then, by the information processing apparatus 101, each process p may be assigned to the determined server Si as the assignment destination, and the processes p1 to pn may be subjected to parallel processing by the servers S1 to Sn.

Thus, it is possible to assign the process p with a high load among the processes p1 to pm to the higher performance CPU 301 by utilizing the performance variation of the CPU 301 of each server Si that occurs during manufacturing of the CPU, and to improve the parallel processing performance of the execution target application AP (processes p1 to pm) with a poor load balance. The information processing method is effective when the execution target application AP is executed a plurality of times while changing execution conditions (various parameters, and the like). For example, the speed may be increased in a case of changing the material of a vehicle when calculating a force applied to the vehicle at a time of collision or in a case of changing a temperature when calculating action of a force between particles.

Further, by the information processing apparatus 101, a difference between times at which each process p starts collective communication may be measured as the load value of each process p. Here, for example, the information processing apparatus 101 measures the difference between the earliest time among times at which each process p starts collective communication and a time at which each process p starts collective communication, as the load value of each process p.

Thus, for example, the load value representing the relative magnitude of the load of each process p in the processes p1 to pm may be estimated from a time difference until the communication is ready, the time difference occurring due to the difference in the processing amount of each process p.

Further, by the information processing apparatus 101, the server Si as the assignment destination of each process p may be determined so that the operating frequency of the server as the assignment destination is higher for a process having a larger load among the processes p1 to pm. Thus, the process p having a high load may be assigned to the high performance CPU 301 in consideration of the performance variation that occurs during manufacturing of the CPU.

Further, by the information processing apparatus 101, the average value of operating frequencies measured while the frequency measurement program is being executed on each server Si may be measured as the maximum operating frequency of each server Si. Thus, it is possible to estimate the operating frequency of the server Si in a steady state in which a change in operating frequency is stable.

From these points, by the information processing apparatus 101, it becomes possible to execute the execution target application AP having a poor load balance at high speed. Further, upon application, this information processing method is easy to be applied because it is not necessary to modify hardware (for example, the servers S1 to Sn) and software (for example, the execution target application AP).

Here, for example, by assigning a high-load process among the processes p1 to pm of the execution target application AP to a high-speed processor, although measurement of a process load is included, the overall processing time becomes shorter than when the measurement of the process load is not included but the slowest progressing process becomes a bottleneck and causes latency. The latency corresponds to, for example, the difference in ending time between the fastest process and the slowest process among the processes p1 to pm of the execution target application AP.

When this information processing method was applied to an application, it was confirmed that a performance improvement effect of several percent was obtained. For example, when a certain application is executed 10 times while changing the execution conditions (various parameters, and the like), the overall processing time takes 100 hours when the information processing method is not applied. On the other hand, when this information processing method is applied, even if the test execution is performed to measure the process load, by assigning thereafter a high-load process among the plurality of processes to a high-speed processor among the plurality of processors including manufacturing variations and executing the process 10 times, the total processing time becomes 96 to 98 hours. Further, by using the processing result obtained by the test execution as one of the results of actual execution, it is possible to further reduce the overall processing time.

Note that the information processing method described in the present embodiment may be implemented by executing a prepared program on a computer such as a personal computer or a workstation. This information processing program is recorded on a computer-readable recording medium such as a hard disk, flexible disk, compact disk read only memory (CD-ROM), digital versatile disc (DVD), or USB memory, and is read from the recording medium to be executed by the computer. Further, this information processing program may be distributed via a network such as the Internet.

Furthermore, the information processing apparatus 101 described in the present embodiments may also be implemented by a special-purpose integrated circuit (IC) such as a standard cell or a structured application specific integrated circuit (ASIC) or a programmable logic device (PLD) such as a field-programmable gate array (FPGA).

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus, comprising:
a memory; and
a first processor coupled to the memory and configured to:
identify a maximum operating frequency of each of a plurality of second processors;
when executing a plurality of processes to be subjected to parallel processing by the plurality of second processors, measure a load value representing a magnitude of a load of each of the plurality of processes;
measure a difference between times at which each of the plurality of processes start inter-process communication as the load value of each of the plurality of processes; and
determine, based on the identified maximum operating frequency of each of the plurality of second processors and the measured load value of each of the plurality of processes, a specific processor as an assignment destination of each of the plurality of processes from the plurality of second processors.

2. The information processing apparatus according to claim 1, wherein the first processor is configured to determine the specific processor as the assignment destination of each of the plurality of processes so that an operating frequency of a processor as the assignment destination is higher for a process having a larger load among the plurality of processes.

3. The information processing apparatus according to claim 1, wherein the first processor is configured to:
assign each of the plurality of processes to the specific processor as the assignment destination, and
cause the plurality of processes to be subjected to parallel processing by the plurality of second processors.

4. The information processing apparatus according to claim 1, wherein each of the plurality of second processors has a higher operating frequency according to a decrease in a temperature of each of the plurality of second processors.

5. An information processing method executed by a computer, wherein the information processing method comprising:
identifying a maximum operating frequency of each of a plurality of processors;
when executing a plurality of processes to be subjected to parallel processing by the plurality of processors, measuring a load value representing a magnitude of a load of each of the plurality of processes;
measuring a difference between times at which each of the plurality of processes start inter-process communication as the load value of each of the plurality of processes; and
determining, based on the identified maximum operating frequency of each of the plurality of processors and the measured load value of each of the plurality of processes, a specific processor as an assignment destination of each of the plurality of processes from the plurality of processors.

6. A non-transitory computer-readable storage medium storing a program that causes a computer to execute a process, the process comprising:
identifying a maximum operating frequency of each of a plurality of processors;
when executing a plurality of processes to be subjected to parallel processing by the plurality of processors, measuring a load value representing a magnitude of a load of each of the plurality of processes;
measuring a difference between times at which each of the plurality of processes start inter-process communication as the load value of each of the plurality of processes; and
determining, based on the identified maximum operating frequency of each of the plurality of processors and the measured load value of each of the plurality of processes, a specific processor as an assignment destination of each of the plurality of processes from the plurality of processors.

7. The non-transitory computer-readable storage medium storing a program according to claim 6, wherein the process further comprising determining the specific processor as the assignment destination of each of the plurality of processes so that an operating frequency of a processor as the assignment destination is higher for a process having a larger load among the plurality of processes.

8. The non-transitory computer-readable storage medium storing a program according to claim 6, wherein the process further comprising
   assigning each of the plurality of processes to the specific processor as the assignment destination, and
   causing the plurality of processes to be subjected to parallel processing by the plurality of processors.

9. The non-transitory computer-readable storage medium storing a program according to claim 6, wherein each of the plurality of processors has a higher operating frequency according to a decrease in a temperature of each of the plurality of processors.

* * * * *